(12) United States Patent
Klump et al.

(10) Patent No.: US 7,617,939 B2
(45) Date of Patent: Nov. 17, 2009

(54) FAUCET MOUNTED WATER FILTER

(75) Inventors: James M. Klump, Crestwood, KY (US); Daniel Ryan Capelle, Corydon, IN (US); Norman J. Boulard, Louisville, KY (US); Jeffery Borden, Louisville, KY (US); Jay Andrew Broniak, Louisville, KY (US); John Steven Holmes, Sellersburg, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/322,695

(22) Filed: Dec. 30, 2005

(65) Prior Publication Data

US 2007/0151919 A1   Jul. 5, 2007

(51) Int. Cl.
*B01D 35/02* (2006.01)
*B01D 35/143* (2006.01)
*B01D 35/157* (2006.01)
*E03B 7/07* (2006.01)
*B01D 35/00* (2006.01)

(52) U.S. Cl. .................. 210/449; 210/418; 210/420; 210/424; 210/85; 210/89; 137/801; 137/562

(58) Field of Classification Search .............. None
See application file for complete search history.

(56) References Cited

U.S. PATENT DOCUMENTS

| | | | |
|---|---|---|---|
| 3,950,253 A | 4/1976 | Stern | |
| 4,312,754 A | 1/1982 | LaFontaine | |
| 4,683,054 A | 7/1987 | Turnbull | |
| 4,735,716 A | 4/1988 | Petrucci et al. | |
| 4,880,535 A | 11/1989 | Burrows | |
| 5,049,270 A | 9/1991 | Carrano et al. | |
| 5,192,436 A * | 3/1993 | Sasaki et al. | 210/264 |
| 5,525,214 A | 6/1996 | Hembree | |
| 5,976,362 A | 11/1999 | Wadsworth et al. | |
| 6,123,837 A * | 9/2000 | Wadsworth et al. | 210/87 |
| 6,241,103 B1 | 6/2001 | Hembree | |
| 6,258,266 B1 | 7/2001 | Riback et al. | |
| D542,374 S | 5/2007 | Green et al. | |

* cited by examiner

*Primary Examiner*—Krishnan S Menon
*Assistant Examiner*—Madeline Gonzalez
(74) *Attorney, Agent, or Firm*—George L. Rideout, Esq.; Armstrong Teasdale LLP

(57) ABSTRACT

A faucet mounted water filtration system includes a base having an inlet, a water receiving chamber, and at least one outlet. The inlet is configured to be coupled to a faucet. A body is coupled to the base. The body includes a filter compartment configured to house a filter cartridge. A cover is rotatably coupled to the body. A cam is operatively coupled to the cover. A valve operatively engages a surface of the cam. The cam is rotatable to move the valve to open and close a passageway to the filter compartment. A biasing element biases the cover to a default position.

17 Claims, 7 Drawing Sheets

FAUCET MOUNTED WATER FILTER

BACKGROUND OF THE INVENTION

This invention relates generally to water treatment systems, and, more particularly, to in-home faucet mounted water filtration systems.

Water treatment devices are generally used to treat water in a home or building for human consumption. At least some known water treatment devices include a filter for filtering particles or sediment from the water. In addition, at least some known water treatment devices include taste and odor filters for reducing chlorine or odor causing material from the water. At least some other known water treatment devices include mercury and lead filters for removing mercury and lead from the water. Furthermore, at least some other known water treatment devices include disinfection devices for removing, killing or inactivating microorganisms such as bacteria, virus, cysts, protozoa, and the like from the water.

In at least some water treatment systems, a filtration device is mounted to a water faucet. However, at lease some faucet mounted filtration systems include external handles or diverters that render the system bulky or cumbersome to operate. At least some faucet mounted filtration systems also include a removable filter cartridge. Moreover, in at least some such systems, the faucet mounted filter system can be moved between a filtering position and a non-filtering position to extend the life of the filter cartridge. Typically, the user is responsible for certain maintenance functions such as the timely replacement of the filter cartridge.

BRIEF DESCRIPTION OF THE INVENTION

In one aspect, a faucet mounted water filtration system is provided. The filtration system includes a base having an inlet, a water receiving chamber, and at least one outlet. The inlet is configured to be coupled to a faucet. A body is coupled to the base. The body includes a filter compartment configured to house a filter cartridge. A cover is rotatably coupled to the body. A cam is operatively coupled to the cover. A valve operatively engages a surface of the cam. The cam is rotatable to move the valve to open and close a passageway to the filter compartment. A biasing element biases the cover to a default position.

In another embodiment, a faucet mounted water filtration system is provided that includes a base having an inlet, a water receiving chamber, and at least one outlet. The inlet is configured to be coupled to a faucet. A body is coupled to the base. The body includes a filter compartment configured to house a filter cartridge. A cover is rotatably coupled to the body. A cam is operatively coupled to the cover. A valve operatively engages a surface of the cam. The cam is rotatable to move the valve to open and close a passageway to the filter compartment. A monitoring system is coupled to the body providing an indication of a condition of the filter cartridge.

DETAILED DESCRIPTION OF THE INVENTION

Figure 1:
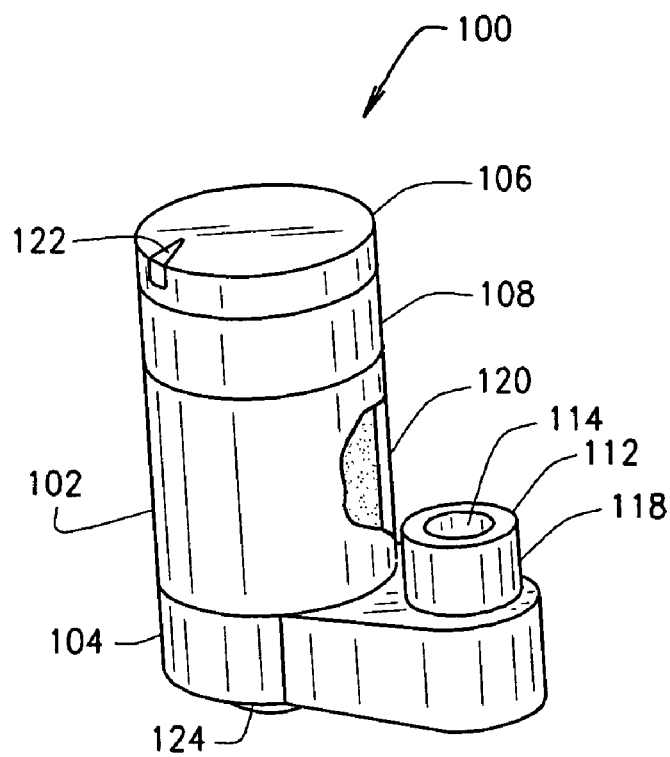
FIG. 1 is a partially cut away perspective view of an exemplary water filter system mountable to a faucet.

FIG. 1 illustrates an exemplary water filter assembly 100 that is mountable to a water faucet. The assembly includes a body 102 coupled to a base 104. A cover 106 is rotatably coupled to body 102. Cover 106 includes a soft touch ring 108 to aid a user in manipulation of cover 106. Base 104 includes a tightening nut 112 having an inlet 114 configured to receive an end of a faucet (not shown). Tightening nut 112 also includes a soft touch ring 118 for ease in manipulating tightening nut 112. Body 102 houses a filter cartridge 120 for filtering water coming into filter assembly 100. In an exemplary embodiment, cover 106 includes a display 122 that provides an indication of a condition of filter cartridge 120. Base 104 includes at least one outlet on an underside 124 that delivers filtered or unfiltered water as selected by a user based on the position of cover 106.

Figure 2:
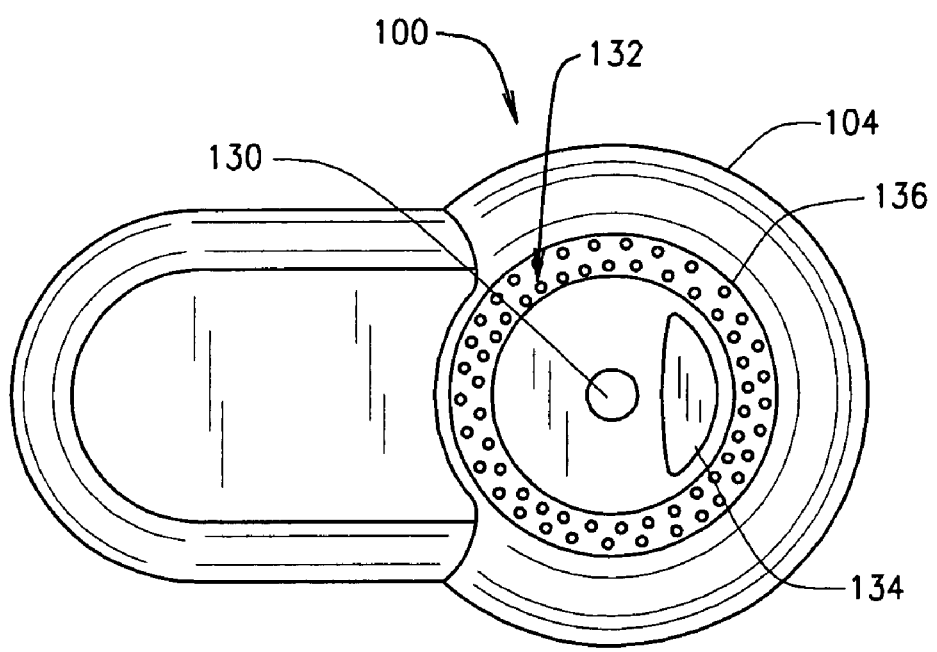
FIG. 2 is a bottom view of the water filter system shown in FIG. 1.

FIG. 2 illustrates underside 124 of filter assembly 100. In an exemplary embodiment, filter assembly 100 includes a first outlet 130 providing a filtered water stream, a second outlet 132 providing an unfiltered water spray, and a third outlet 134 provided an unfiltered water stream. The water stream provided at third outlet 134 may or may not be an aerated water stream. Outlets 130, 132, and 134 are formed in a cap 136 that may be removed for outlet screen cleaning. In one embodiment, cap 136 is threadedly attached to base 104.

Figure 3:
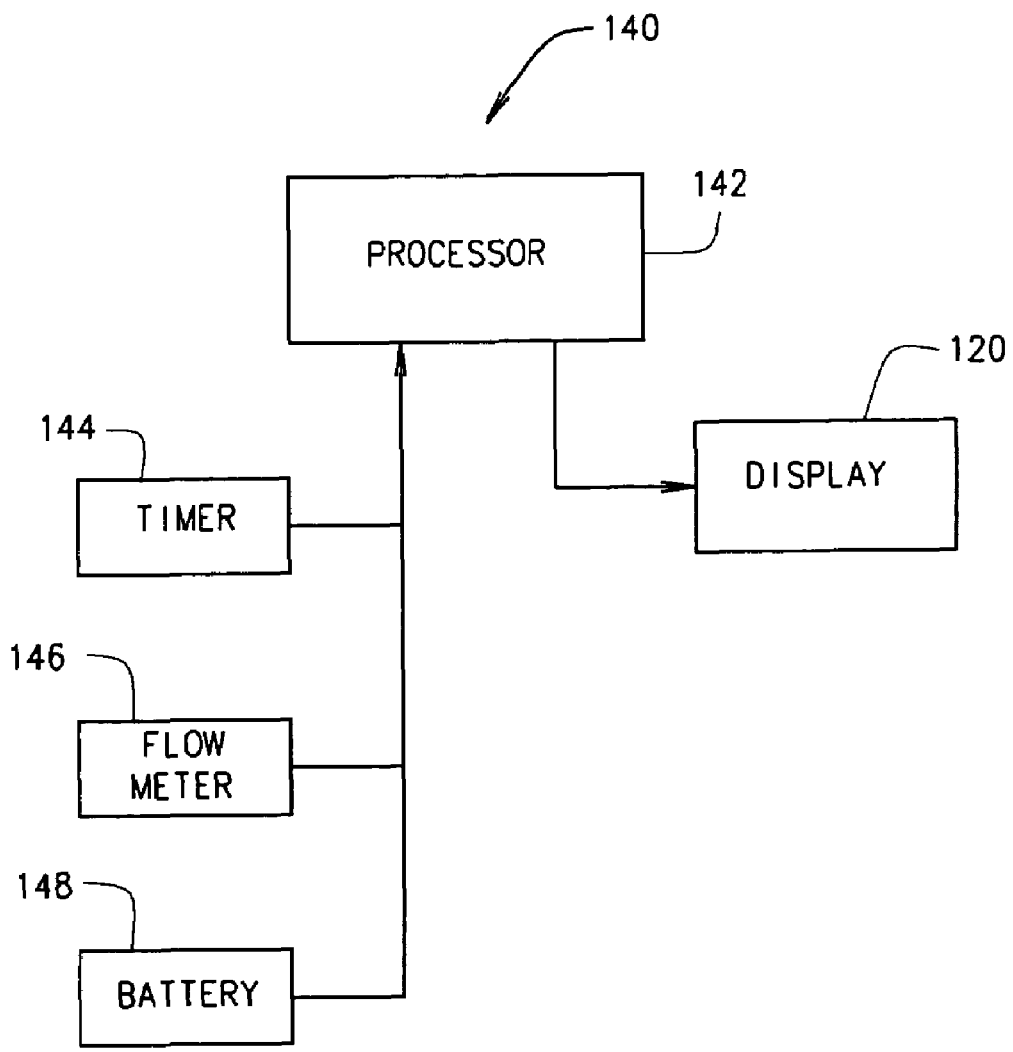
FIG. 3 is a schematic block diagram of an exemplary monitoring system for a faucet mount water filter system.

FIG. 3 illustrates a schematic block diagram of a monitoring system 140 for use with filter assembly 100 to monitor a condition of filter cartridge 120. Monitoring system 140 monitors a time that filter cartridge 120 has been in service or in use in body 102 and also a volume of water flow through filter cartridge 120. Indications of the condition of filter cartridge 120 are displayed in display 122. In an exemplary embodiment, display 122 may include one or more light emitting diodes (LED's) that visually indicate the condition of filter cartridge 120. In an exemplary embodiment, monitoring system 140 includes a processor 142 and a timer 144. Timer 144 may, in one embodiment, be included within processor 142. In other embodiments, timer 144 may be external to processor 142. When timer 144 is external to processor 142, timer 144 may be reset when filter cartridge 120 is changed. Monitoring system 140 may also include a flow meter 146 for monitoring a volume of water filtered by filter cartridge 120. Monitoring system 140 is powered by a battery 148. In an exemplary embodiment, processor 142 also monitors a condition of battery 148 and provides an indication that battery 148 needs replacement when the useful life of battery 148 is reached.

Figure 4:
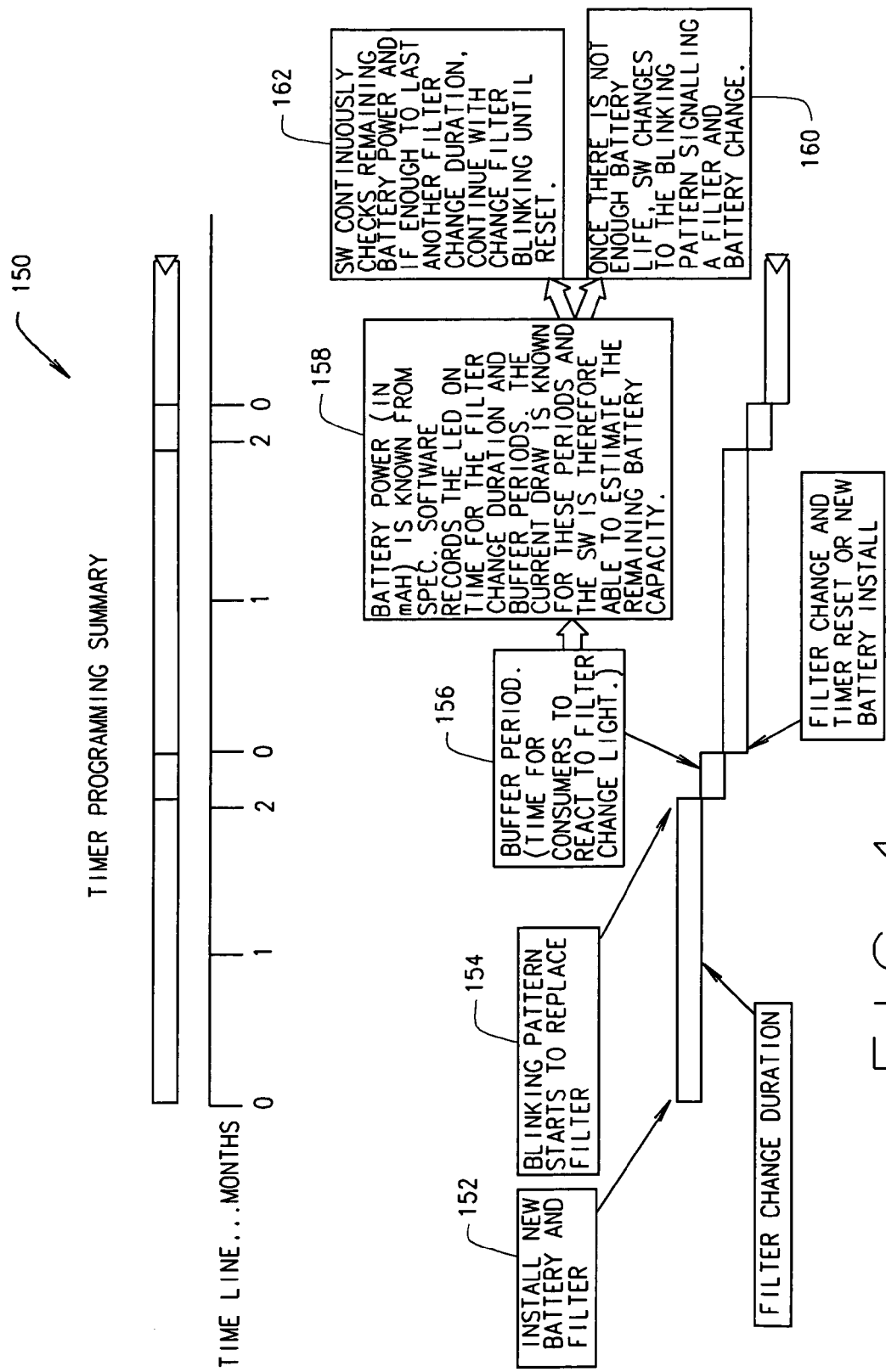
FIG. 4 is a schematic view of a software algorithm for the monitoring system shown in FIG. 3.

FIG. 4 illustrates a software algorithm 150 that may be incorporated in processor 142 for monitoring the condition of filter cartridge 120. Algorithm 150 begins at step 152 with the installation of a new filter cartridge and a new battery 148 (FIG. 3). At step 154, processor 142 sends a blinking pattern to display 122 after a default time period. In one embodiment, the default time period is a period of two months. A buffer period is provided at 156 for the user to replace filter cartridge 120. In one embodiment, when filter cartridge 120 is replaced, the timer is reset. Alternatively, battery 148 may be replaced when filter cartridge 120 is replaced. At step 158, processor 142 estimates a remaining battery capacity based on the time the battery has been in use. If the remaining battery capacity is determined to be less than that needed for the life of a filter cartridge, algorithm 150 continues at step 160 where a another blinking pattern is shown in display 122 signaling a need for a filter cartridge change and a battery change. In one embodiment, the blinking pattern signaling the need for both a filter cartridge change and a battery change is faster than the blinking pattern signaling the need for only a filter cartridge change. If the battery capacity is determined to be sufficient for the life of another filter cartridge, processing continues at step 162 where display 122 continues to indicate a need for a filter change.

Figure 5:
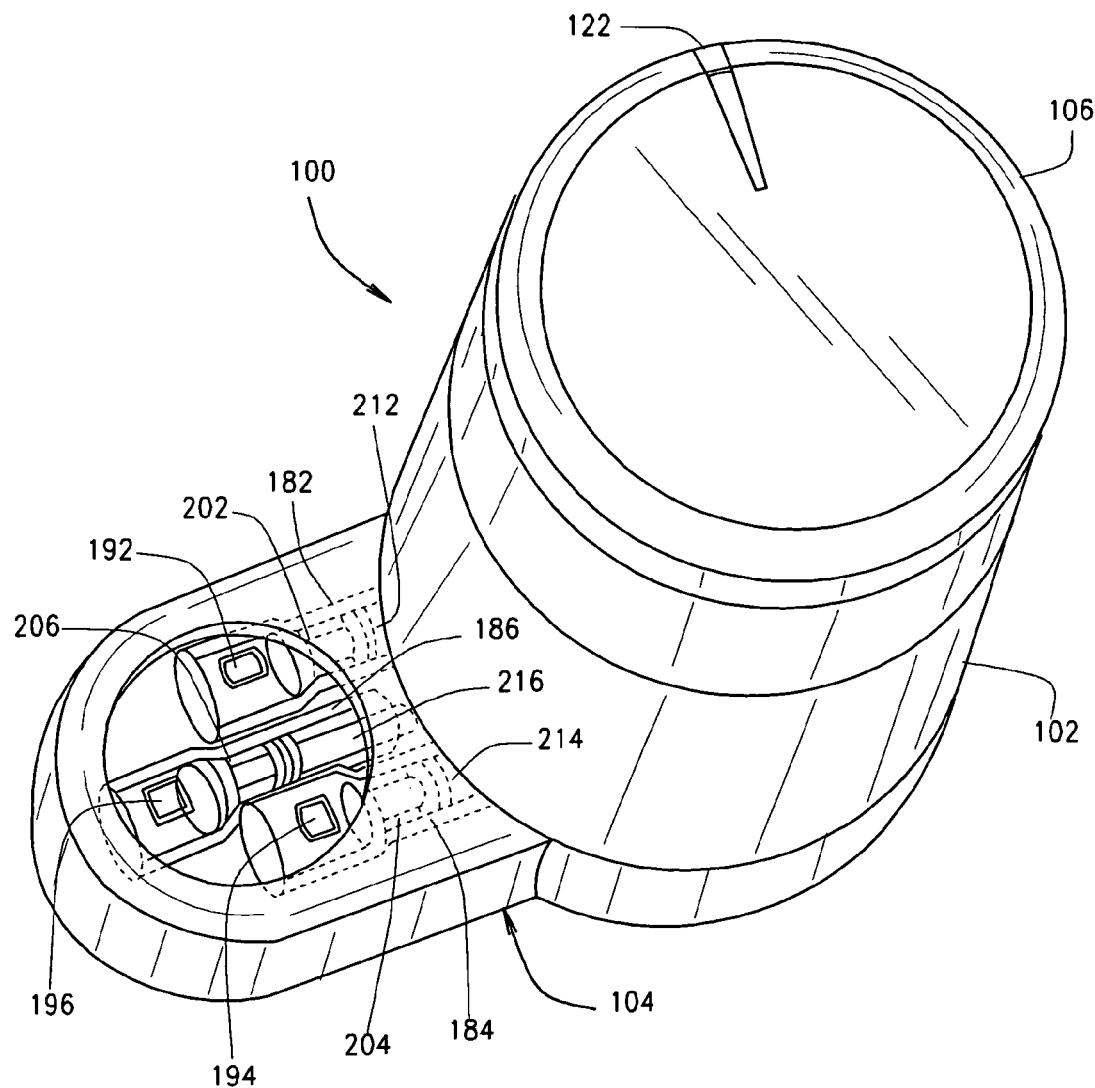
FIG. 5 is a top perspective view of a filter assembly with a tightening nut section removed.

FIG. 5 illustrates a top perspective view of filter assembly 100 with tightening nut 112 removed. Inlet 114 in tightening nut 112 opens into a water receiving chamber 180. Water receiving chamber 180 includes a plurality of passageways in fluid communication with at least one outlet from water receiving chamber 180. More specifically, water receiving chamber 180 includes a first passageway 182 in fluid communication with first outlet 130, a second passageway 184 in fluid communication with second outlet 132, and a third passageway 186 in fluid communication with third outlet 134. Each passageway 182, 184, and 186 includes an inlet 192, 194, and 196 respectively and an outlet 202, 204, and 206 respectively.

Each passageway 182, 184, and 186 also includes a valve 212, 214, and 216, respectfully that is positioned within each passageway 182, 184, 186 to control water flow between inlets 192, 194, 196 and outlets 202, 204, 206 of passageways 182, 184, 186. Valves 212, 214, and 216 are movable along a length of each respective passageway to allow water to flow from a respective inlet to a respective outlet as will be described.

Figure 6:
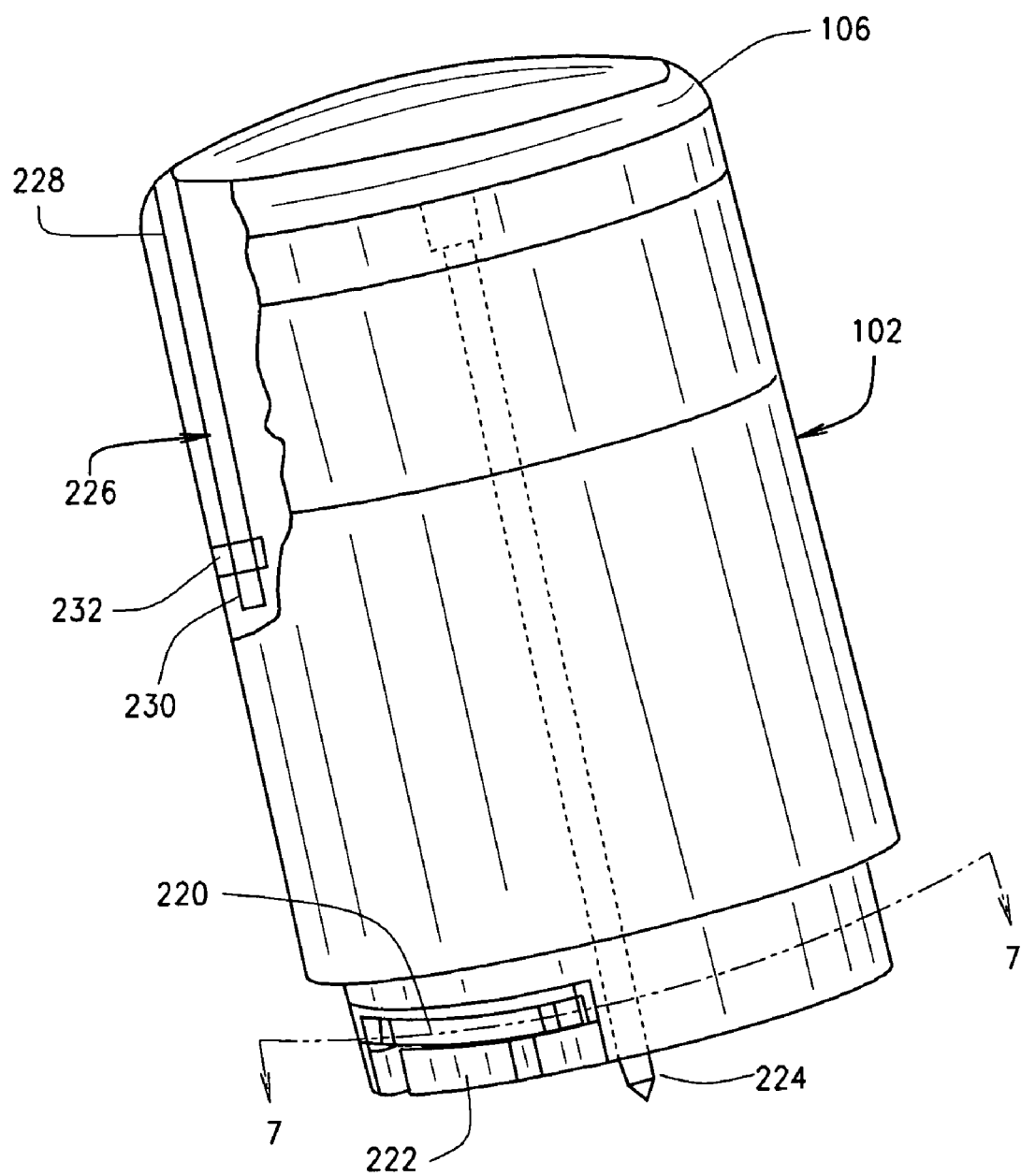
FIG. 6 is a perspective view of the filter system shown in FIG. 1 with the base removed.

FIG. 6 illustrates a perspective view of filter assembly 100 with base 104 removed. A cam 220 and a detent member 222 are rotatably mounted at a lower end of body 102. An actuating shaft 224 extends through a center channel of filter cartridge 120 (FIG. 1) within body 102 and is coupled to an underside of cover 106 (shown in phantom outline) so that cam 220 and detent member 222 are rotated by rotation of cover 106. Valves 202, 204, and 206 (FIG. 5) are moved or operated by rotation of cam 220 and detent member 222.

A biasing member 226 is provided in filter assembly 100 to bias cover 106, cam 220, and detent member 222 in a neutral position. Biasing member is coupled between cover 106 and body 102. In one embodiment, biasing member 226 is a flat spring having a first end 228 coupled to cover 106 and a second end 230 that is received and slidably retained by a retention element 232 formed on an inner wall of body 102. Biasing member 226 is operable to bias cover 106, cam 220, and detent member 222 toward the neutral position in response to either clockwise or counterclockwise rotation of cover 106.

Figure 7:
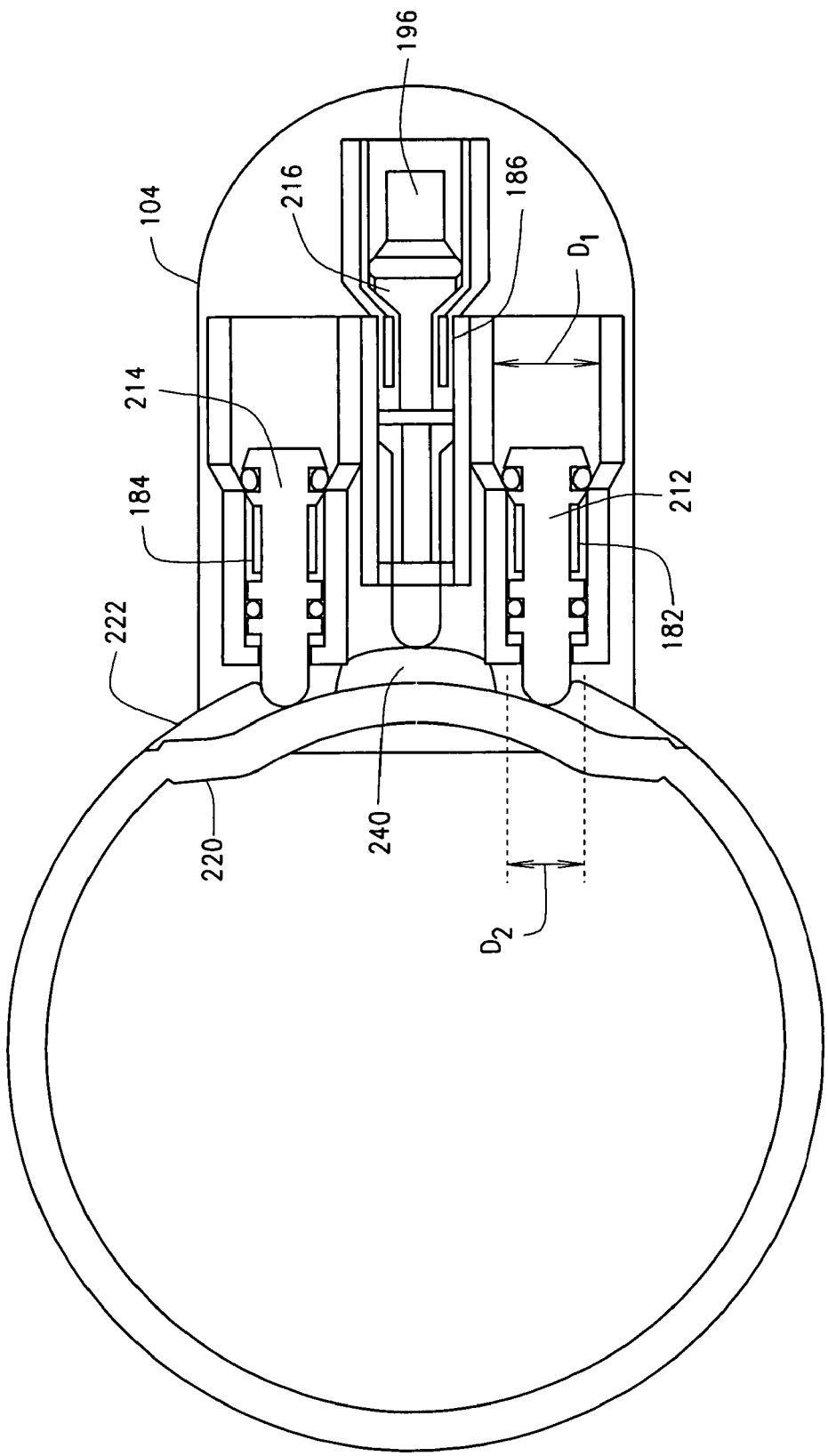
FIG. 7 is a cross sectional view taken along the line 7-7 through the cam shown in FIG. 6 with the cam and detent member in a default position.

FIG. 7 illustrates a cross sectional view through cam 220 with cam 220 and detent member 222 in a neutral or default position. First valve 212 and second valve 214 engage cam 220 and are operated by rotation of cam 220. Valve 216 engages detent member 222 and is operated by rotation of detent member 222. In the neutral or default position illustrated, first valve 212 and second valve 214 are in a closed position such that flow of water through passageways 182 and 184 is disabled. Third valve 206 engages detent member 222 at a center section 240. When valve 216 engages center section 240, valve 216 is moved to an open position where water flow through passageway 186 is enabled.

In an exemplary embodiment, each passageway 182, 184, and 186 has a first diameter $D_1$ proximate passageway inlets 192, 194, and 196 (FIG. 5) and a second diameter $D_2$ proximate passageway outlets 202, 204, and 206 (FIG. 5). In the exemplary embodiment, first diameter $D_1$ is greater than second $D_2$ and further passageways 182, 184, and 186 are substantially uniform in size. In alternative embodiments, passageways 182, 184, and 186 may be of different diameters.

Figure 8:
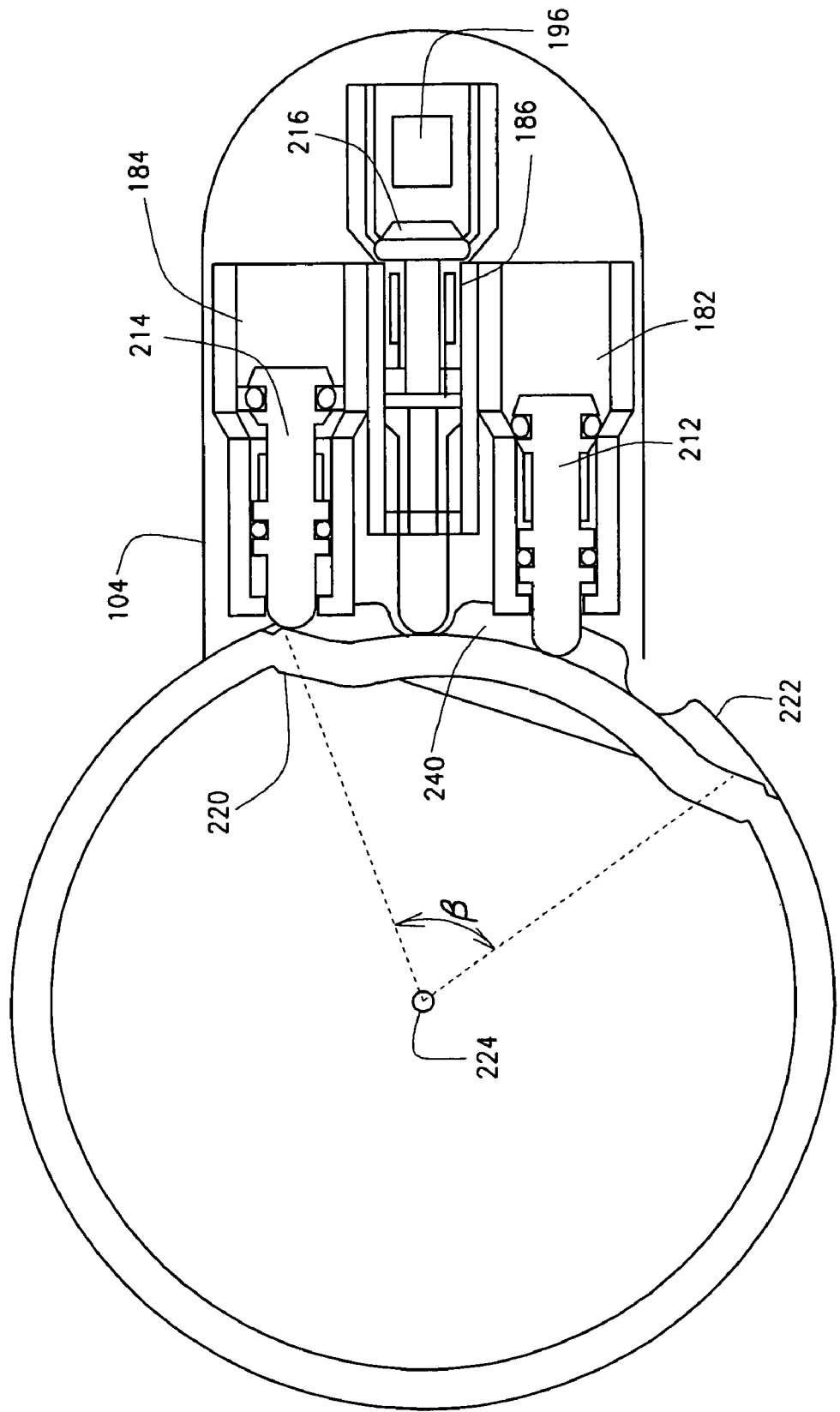
FIG. 8 is a cross sectional view taken along the line 7-7 through the cam shown in FIG. 6 with cam and detent member rotated away from the default position.

FIG. 8 is a cross sectional view through cam 220 with cam 220 and detent member 222 rotated away from the neutral or default position. As illustrated, cam 220 moves valve 214 to an open position wherein water flow through passageway 184 is enabled. Valve 212 is in a closed position. Also, valve 216 is moved away from center section 240 on detent member 222 and is in a closed position. Cam 220 and detent member 222 are formed such that only one of valves 212, 214, and 216 is in an open position at one time. Further, biasing member 226 returns cover 106 as well as cam 220 and detent member 222 to the neutral or default position when the user turns off the water at the faucet. However, when the water is turned on, water pressure on valves 212, 214, and 216 is sufficient to overcome biasing member 226 and hold cover 106, cam 220 and detent member 222 in the position selected by the user.

Cam 220 and also cover 106 are rotatable through an angle β from a first position to a second position. First position is depicted in FIG. 8 and represents clockwise rotation of cover 106 and cam 220 from a neutral position to a position wherein valve 212 is in an open positioning an exemplary embodiment, when valve 212 is in an open position, filtered water is provided. In the second position (not shown), cover 106 and cam 220 are rotated in a counterclockwise direction to a position wherein valve 214 is in an open position. In one embodiment, when valve 214 is in an open position, unfiltered is provided. In an exemplary embodiment, second position is an unfiltered spray. The neutral or default position is between the first and second positions.

Valves 212, 214, and 216 are of a construction well known in the art. Generally, each of valves 212, 214, and 216 are formed with substantially cylindrical bodies including a contact tips that engage cam 220 and detent member 222. The bodies include first and second sections having raised diameters that are slightly less than passageway diameters D1 and D2. Each of the first and second sections are configured to receive a seal for sealing against the interior of passageways 182, 184, and 186.

The above-described faucet mounted filter assembly provides a cost-effective and reliable system for filtering water at a faucet. The assembly allows the user to select filtered or unfiltered water. The assembly provides an unfiltered default position that extends the life of the filter cartridge. The system automatically returns to the default position when the water is turned off. A monitoring system monitors the time the filter cartridge has been in service and also the volume of water passing through the filter cartridge. A display gives a visual indication that the filter cartridge should be replaced and also that the monitoring system battery should be replaced.

Exemplary embodiments of a faucet mounted water filter assembly are described above in detail. The components of the faucet mounted filter assembly are not limited to the specific embodiments described herein, but rather may be utilized independently and separately from other components described herein. Each component can also be used in combination with other water filter assemblies.

While the invention has been described in terms of various specific embodiments, those skilled in the art will recognize that the invention can be practiced with modification within the spirit and scope of the claims.

What is claimed is:

1. A faucet mounted water filtration system comprising:
a base having an inlet, a water receiving chamber, and at least one outlet, said inlet configured to be coupled to a faucet;
a body coupled to said base, said body defining a filter compartment configured to house a filter cartridge;
a cover rotatably coupled to said body, said cover encapsulating said filter compartment;
a cam operatively coupled to said cover, said cover rotatable to move said cam between a default position, a first position, and a second position;
a valve operatively engaging a surface of said cam, said cam rotatable to move said valve to open and close a passageway to said filter compartment; and
a biasing element positioned to bias said cam to the default position when a water flow through the faucet is stopped, wherein said valve is in a closed position with said cam at the default position.

2. A faucet mounted water filtration system in accordance with claim 1 further comprising a plurality of valves and a detent member engaging one of said plurality of valves.

3. A faucet mounted water filtration system in accordance with claim 1 wherein said water receiving chamber includes a plurality of passageways in fluid communication with said at least one outlet.

4. A faucet mounted water filtration system in accordance with claim 1 further comprising an actuating element interconnecting said cover and said cam.

5. A faucet mounted water filtration system in accordance with claim 1 wherein said cover is rotatable between a first cover position and a second cover position, said first cover position positioning said cam such that filtered water is provided at said at least one outlet, said second cover position positioning said cam such that unfiltered water is provided at said at least one outlet.

6. A faucet mounted water filtration system in accordance with claim 1 wherein said at least one outlet includes a first outlet providing a filtered water stream.

7. A faucet mounted water filtration system in accordance with claim 6 wherein said at least one outlet includes a second outlet providing an unfiltered water spray.

8. A faucet mounted water filtration system in accordance with claim 7 wherein said at least one outlet includes a third outlet providing an unfiltered water stream.

9. A faucet mounted water filtration system in accordance with claim 5 wherein said default position comprises a third cover position between said first cover position and said second cover position.

10. A faucet mounted water filtration system comprising:
a base having an inlet, a water receiving chamber, and at least one outlet, said inlet configured to be coupled to a faucet;
a body coupled to said base, said body defining a filter compartment configured to house a filter cartridge;
a cover rotatably coupled to said body, said cover encapsulating said filter compartment;
a cam operatively coupled to said cover, said cover rotatable to move said cam between a default position, a first position, and a second position;
a valve operatively engaging a surface of said cam, said cam rotatable to move said valve to open and close a passageway to said filter compartment;
a monitoring system coupled to said body providing an indication of a condition of the filter cartridge; and
a biasing element biasing said cam to the default position, said valve is in a closed position with said cam at the default position, said biasing element configured to bias said cam to the default position when a flow of water through the faucet is stopped.

11. A faucet mounted water filtration system in accordance with claim 10 wherein said monitoring system provides a replacement indication for the filter cartridge based on time.

12. A faucet mounted water filtration system in accordance with claim 10 wherein said monitoring system provides a replacement indication for the filter cartridge based on a volume of water flow through the filter cartridge.

13. A faucet mounted water filtration system in accordance with claim 10 wherein said monitoring system further comprises a display mounted on said body.

14. A faucet mounted water filtration system in accordance with claim 10 wherein said water receiving chamber includes a plurality of passageways in fluid communication with said at least one outlet.

15. A faucet mounted water filtration system in accordance with claim 10 wherein said cover is rotatable between a first cover position and a second cover position, said first cover position positioning said cam such that filtered water is provided at said at least one outlet, said second cover position positioning said cam such that unfiltered water is provided at said at least one outlet.

16. A faucet mounted water filtration system in accordance with claim 10 wherein said at least one outlet includes a first outlet providing a filtered water stream, a second outlet providing an unfiltered water spray, and a third outlet providing an unfiltered water stream.

17. A faucet mounted water filtration system in accordance with claim 10 further comprising a plurality of valves and a detent member engaging one of said plurality of valves.

* * * * *